(12) United States Patent
Anvari

(10) Patent No.: US 7,305,041 B2
(45) Date of Patent: Dec. 4, 2007

(54) PEAK SUPPRESSION OF MULTI-CARRIER SIGNAL WITH DIFFERENT MODULATION

(75) Inventor: Kiomars Anvari, Alamo, CA (US)

(73) Assignee: Kiomars Anvari, Alamo, CA (US)

( * ) Notice: Subject to any disclaimer, the term of this patent is extended or adjusted under 35 U.S.C. 154(b) by 729 days.

(21) Appl. No.: 10/782,158

(22) Filed: Feb. 20, 2004

(65) Prior Publication Data

US 2005/0185723 A1 Aug. 25, 2005

(51) Int. Cl.
*H04K 1/10* (2006.01)
*H04K 1/02* (2006.01)
*H04B 1/04* (2006.01)
*H04B 1/38* (2006.01)
*H01Q 11/12* (2006.01)
*H03F 1/26* (2006.01)
*H03F 1/36* (2006.01)
*H03G 3/20* (2006.01)

(52) U.S. Cl. .................. 375/260; 375/296; 375/297; 455/114.3; 455/114.2; 455/114.1; 455/127.1; 455/571; 330/149; 330/107; 330/136

(58) Field of Classification Search ................. 375/260
See application file for complete search history.

(56) References Cited

U.S. PATENT DOCUMENTS 4,291,277 A * 9/1981 Davis et al. ................. 330/149
5,699,383 A * 12/1997 Ichiyoshi ..................... 375/297
6,112,062 A * 8/2000 Hans et al. ............... 455/114.3
6,141,390 A * 10/2000 Cova .......................... 375/297
6,246,286 B1 * 6/2001 Persson ..................... 330/149
2003/0156658 A1 * 8/2003 Dartois ....................... 375/297
2004/0264416 A1 * 12/2004 Robinson et al. ........... 370/335
2005/0017800 A1 * 1/2005 Robinson ..................... 330/149
2005/0017801 A1 * 1/2005 Bachman et al. ............ 330/149

* cited by examiner

Primary Examiner—Mohammed Ghayour
Assistant Examiner—Nurul M Matin

(57) ABSTRACT

A technique for peak suppression, phase and amplitude equalizer of multi-carrier signals with different modulation is described. The input to the multi-carrier power amplifier is modified by a peak suppression, phase and amplitude equalizer circuit prior to being applied to the amplifier. The peak suppression is applied to a multi-carrier signal with different modulations and bandwidth. After peak suppression each individual carrier is phase and amplitude equalized to maintain the properties of the multi-carrier signal. The phase equalizer maintain the timing property of the carriers and the amplitude equalizer maintain the modulation accuracy of the individual carriers. The input to the peak-to-average reduction circuit could be a baseband, an intermediate frequency (IF) or radio frequency (RF) signal. The peak-to-average reduction is performed in digital domain.

16 Claims, 5 Drawing Sheets

PEAK SUPPRESSION OF MULTI-CARRIER SIGNAL WITH DIFFERENT MODULATION

BACK GROUND OF INVENTION

The present invention relates to a peak suppression, phase and amplitude equalizer circuit to boost the out put power of a multi-carrier wireless RF power amplifier. The peak suppression, phase and amplitude equalizer circuit input could be baseband, intermediate frequency (IF), or RF signal, and its output is the peak-to-average reduced RF signal as a new input to the amplifier. In any wireless communication system one of the critical components is the power amplifier. This component has a major contribution in cost, power consumption, and size of the system. The main reason is the requirement of wireless radio communication system for linear power amplifiers. The higher the linearity, the higher the power consumption, cost and size. In order to minimize the cost, size and power consumption there is a need for techniques that overcome this problem. This invention conquers these challenges by using a simple and accurate peak suppression, phase and amplitude equalizer module used at the input to the power amplifier.

SUMMARY OF INVENTION

According to the invention, a peak suppression, phase and amplitude equalizer circuit, used for multi-carrier signals, where individual carriers use different modulation and bandwidth, uses a plurality of simple and accurate circuits in conjunction with intelligent signal processing to reduce the peak to average ratio without disturbing the properties of the multi-carrier signal. By intelligent, it is meant that the peak suppression, phase and amplitude equalizer module has features of adaptability to the input samples, such as ability to consider the changes due to samples amplitude and phase. The peak suppression, phase and amplitude equalizer module uses the amplifier input which could be a baseband, an IF or RF signal as its input and condition the input before applying to the multi-carrier amplifier. The conditioning or peak suppression, phase and amplitude equalizer helps to boost the power handling of the amplifier or acts more linearly. The conditioning is based on a hybrid technique that utilizes both amplitude clipping and phase rotation using pre-defined parameters stored in a lookup table for peak-to-average reduction. The input to the peak suppression, phase and amplitude equalizer should be within a limit that can be handled by the peak suppression, phase and amplitude equalizer module.

In a particular embodiment, the peak suppression, phase and amplitude equalizer unit comprises a multi-carrier transmitter, a multi-carrier broadband receiver, a signal processing, and a clock generator. The receiver converts the baseband, IF, or RF signal to digital baseband. The transmitter converts the digital baseband signal to RF. The signal processor performs the signal conditioning as well as performs the initial calibration, and transmitter and receiver control.

The invention will be better understood by reference to the following detailed description in conjunction with the accompanying drawings.

DESCRIPTION OF THE SPECIFIC EMBODIMENTS

In a first preferred embodiment the peak suppression, phase and amplitude equalizer circuit monitors the signal strength of the multi-carrier input signal channels using the input receiver and finds the frequency and channel number of the input signals. In a second preferred embodiment of the invention, the peak suppression, phase and amplitude equalizer circuit uses sub-harmonic sampling to convert multi-carrier RF or IF signals to digital baseband signal. In a third preferred embodiment the input signal is conditioned or peak suppressed using the amplitude clipping, phase rotation, and amplitude and phase equalization. The peak-to-average reduction using phase rotation is based on data stored in a lookup table and an algorithm to define the final phase rotation for individual carriers. The peak-to-average reduced signal is then transmitted to the amplifier. In a fourth embodiment the input signal is used to create the lookup table. In a fifth embodiment the digital baseband signal is amplitude clipped and then down converted to produce the individual carrier baseband signal. In a six embodiment the individual baseband signals are phase rotated using the associated lookup table phase before being individually filtered and up converted to reconstruct the multi-carrier digital baseband signal. In a seventh embodiment the amplitude and phase equalization is applied to individual carriers to maintain their baseband properties before being upconveted to reconstruct the multi-carrier digital baseband signal. In an eight embodiment the multi-carrier baseband signal before being applied to phase rotation block is applied to the phase rotation algorithm block to construct the peak-to-average reduction phase rotation lookup table.

Figure 1:
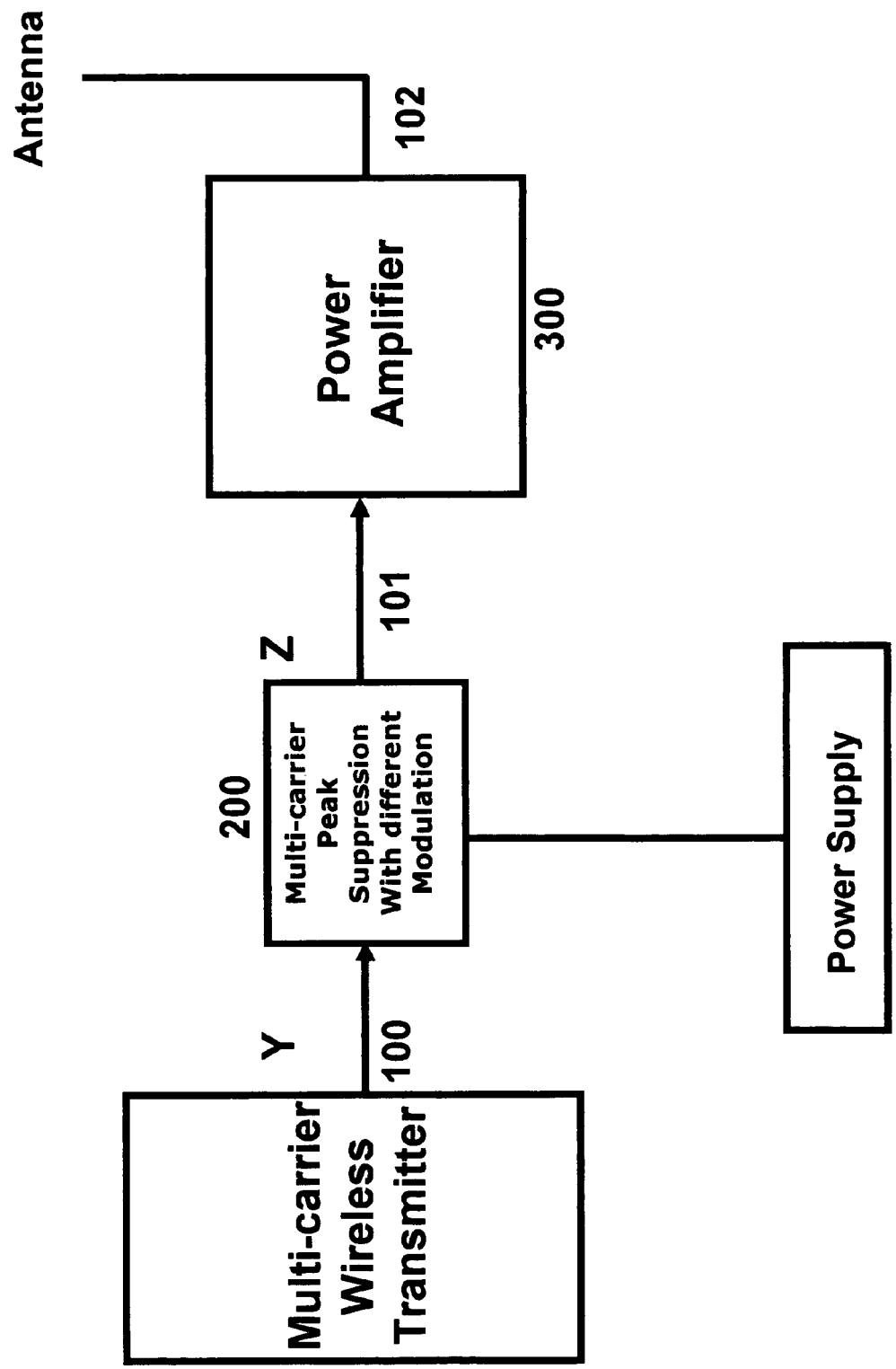
FIG. 1 is an overall block diagram of the a power amplifier with a booster using peak suppression, phase and amplitude equalizer

Referring to FIG. 1, a peak suppression, phase and amplitude equalizer circuit diagram is illustrated. The system receives its inputs from wireless transmitter 100. The output of the peak suppression, phase and amplitude equalizer circuit 200 is applied to the input of the power amplifier. The peak suppression, phase and amplitude equalizer circuit performs the following functions:

1. Find the frequencies and channel numbers of the multi-carrier wireless transmitter output 100.
2. Reduce the peak-to-average of the input signal 100 before applying to amplifier.
3. Phase and amplitude equalize the peak suppressed individual baseband signals
4. Use the amplitude clipped signal to create the phase rotation lookup table
5. Adaptively adjust the gain in the signal paths to keep the total gain from input to output of the peak suppression, phase and amplitude equalizer zero.

Figure 2:
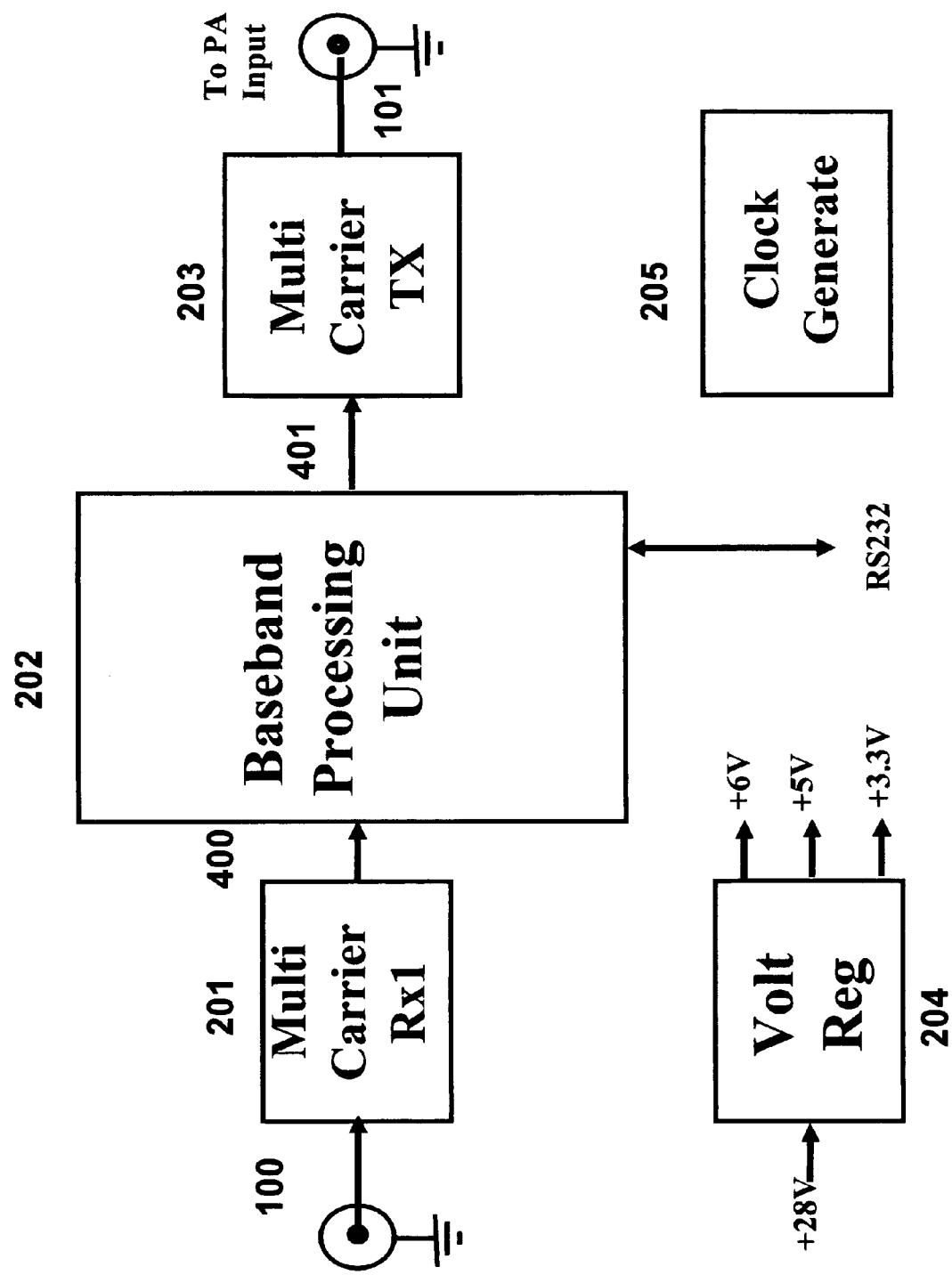
FIG. 2 is the block diagram of the peak suppression, phase and amplitude equalizer module

FIG. 2 illustrates the detail block diagram of the peak suppression, phase and amplitude equalizer circuit unit. The received signal from multi-carrier wireless transmitter 100 is applied to multi-carrier receiver 201 to produce signal 400. The output of the multi-carrier receiver 201 is applied to signal processing block 202 for digital signal processing which is peak suppression, phase and amplitude equalizer and creation of the phase rotation lookup table for peak-to-average reduction. The output of signal processing block 202 the peak-to-average reduced signal 401 is applied to multi-carrier transmitter 203 to create the input signal 101 for the multi-carrier power amplifier. Clock generator 205 produces all the clocks necessary for the peak-to-average reduction circuit and the power supply block 204 produce all the voltages necessary for the peak-to-average reduction circuit.

Figure 3:
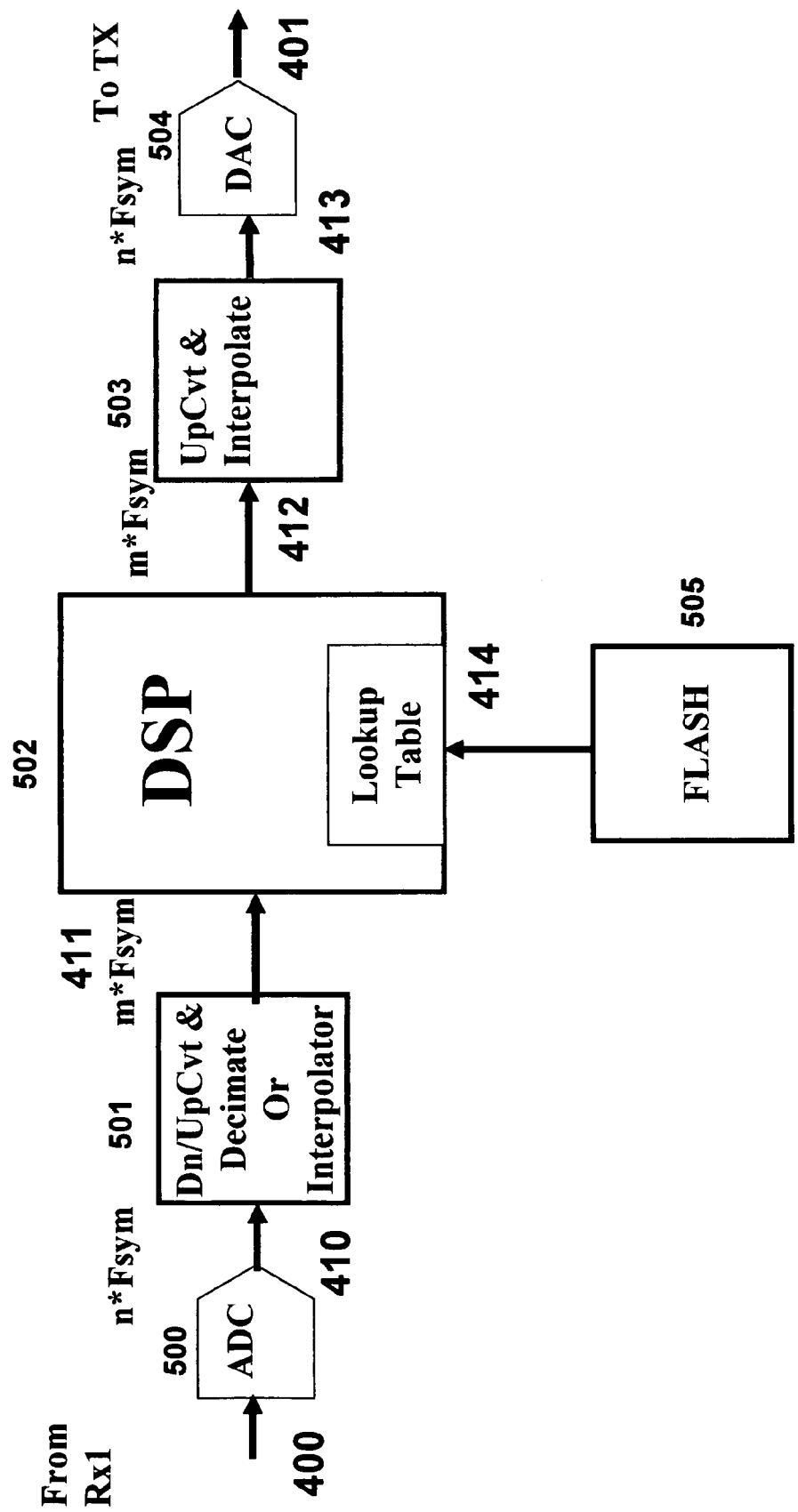
FIG. 3 is the block diagram of the digital processing unit of peak suppression, phase and amplitude equalizer module

FIG. 3 shows the detail block diagram of the peak suppression, phase and amplitude equalizer signal processing block 202. The receiver block 201 output 400 is applied to analog to digital converter (in case the signal is RF, IF, and baseband) block 500 to produce the digital signal 410. If the signal is RF or IF the analog to digital conversion is based on sub-harmonic sampling. The output of the analog to digital converter 500 is applied to the down/up converter block 501 to produce down converted and decimated (multi-carrier baseband) signal 411 which is "m" times the symbol rate of the input signal 100 applied to receiver 201. In case the signal is a multi-carrier baseband signal the down/up converter function will not be used, however the baseband signal may need to be interpolated or decimated to produce the right number of samples per symbols. If the signal is baseband but in bit format the up conversion function of 501 is used. The signal is converted to symbol domain with desired samples per symbol first and then each channel is up converted to its baseband frequency to produce multi-carrier baseband signal 411. The signal 411 is applied to DSP block 502 for peak suppression, phase and amplitude equalizer and produce signal 412. The peak-to-average reduced signal 412 is applied to up converter and interpolator 503 to produce the up converted and interpolated signal 413. Signal 413 is applied to digital to analog converter 504 to produce the analog signal 401 for the multi-carrier transmitter block 203.

Figure 4:
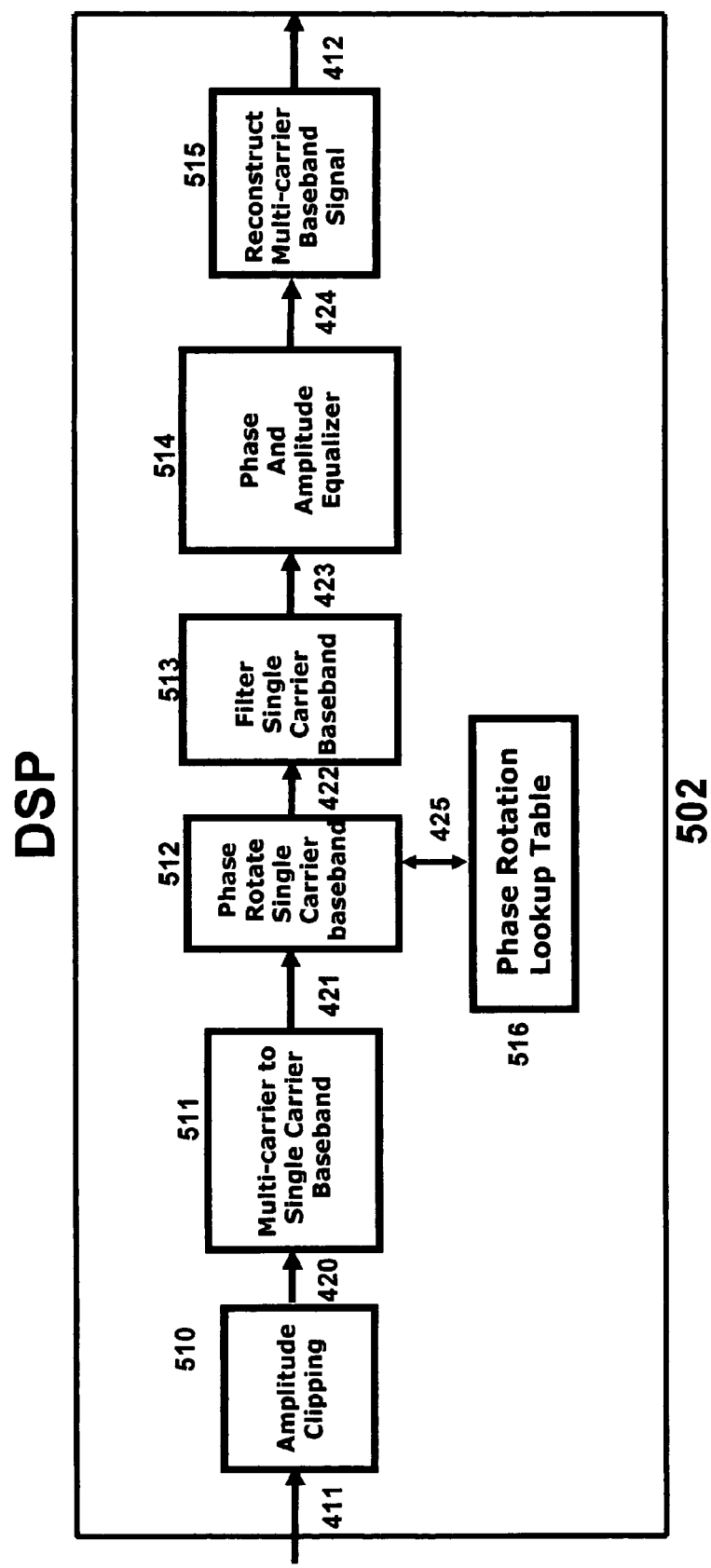
FIG. 4 is the block diagram of the digital signal processing block performing the peak suppression, phase and amplitude equalizer

FIG. 4 shows the block diagram of the peak suppression, phase and amplitude equalizer block 502. The multi-carrier baseband signal 411 from the main multi-carrier receiver is amplitude clipped by block 510 to produced the amplitude clipped signal 420. The amplitude clipped multi-carrier signal 420 is converted to single carrier baseband signals by block 511 to produce the baseband representative of each individual carrier. The single carrier baseband signal 421 is then phase rotated according to an specified phase by a pre-defined phase in block 512. The pre-defined phase is taken from the phase rotation lookup table block 516. The data in lookup table 516 is generated by a phase rotation algorithm. The individual phase rotated single carrier baseband signals 422 are filtered by filter block 513 to produce the phase rotated and filtered signals 423. The individual phase rotated and filtered baseband signal 423 are then phase and amplitude equalized by block 514 to produce phase and amplitude equalized individual baseband signal 424. The phase and amplitude equalized signals 424 are applied to block 515 to reconstruct the multi-carrier baseband signal 412.

Figure 5:
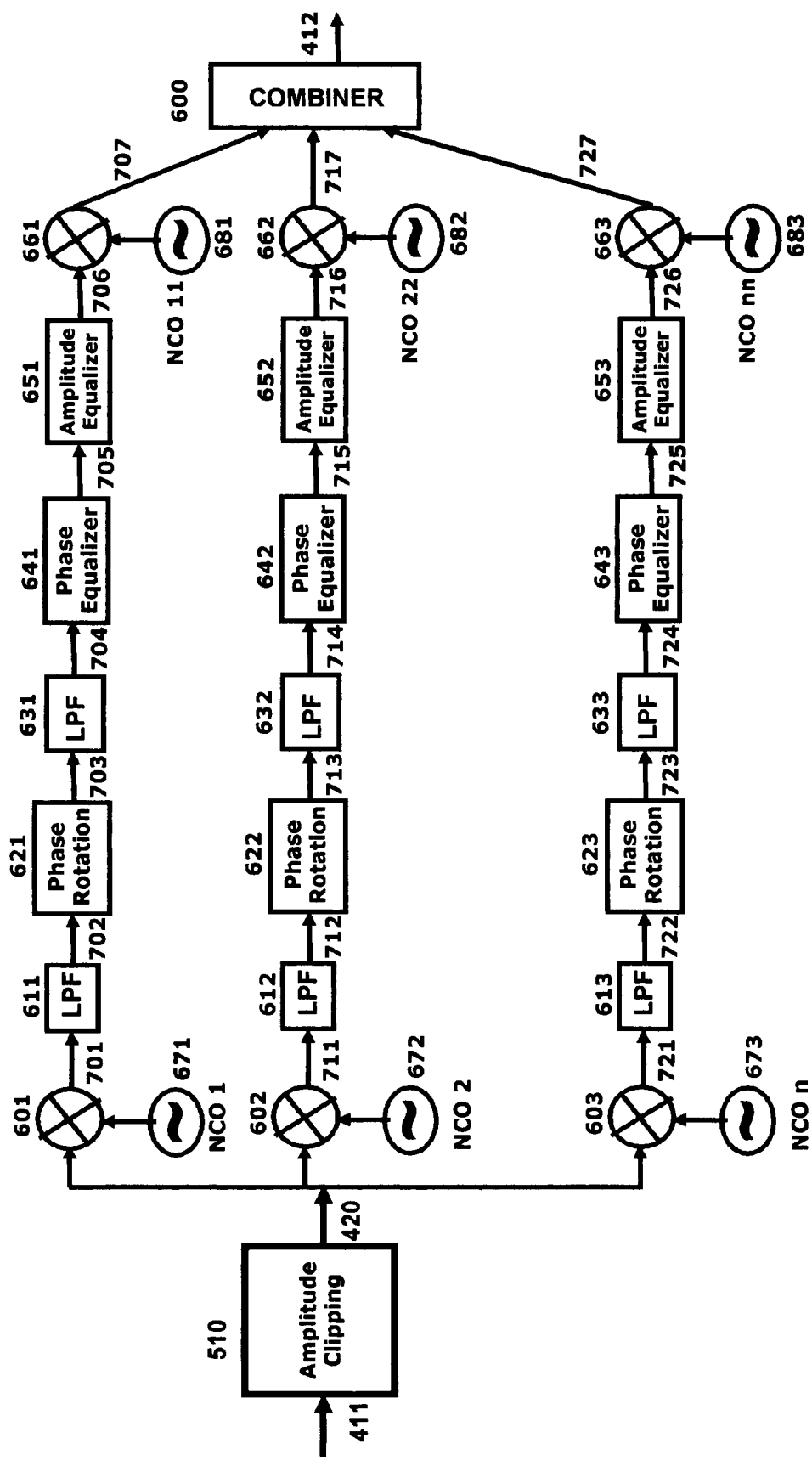
FIG. 5 is the detail block diagram of peak suppression, phase and amplitude equalizer

FIG. 5 shows the detail block diagram of the peak suppression, phase and amplitude equalizer circuit. The multi-carrier baseband signal 411 from the receiver is applied to block 510 to produce the amplitude clipped multi-carrier signal 420. The amplitude clipped multi-carrier baseband signal 420 is applied to down converters 601, 602, and 603 to produce the baseband signal of each carrier 701, 711, and 721. The second input to down converters 601, 602, and 603 are supplied by NCOs 671, 672, and 673. The baseband representative of each carrier then is applied to Low Pass Filters (LPF) 611, 612, and 613 to filter unwanted signals. The baseband representative of each carrier 702, 712, and 722 are then phase rotated by blocks 621, 622, 623 to produce the amplitude limited and phase rotated signals 703, 713, and 723. The amount of phase rotation is calculated from the output of 611, 612, and 613. The amplitude limited and phase rotated baseband signals 703, 713 and 723 are applied to low pass filters 631, 632, and 633 to produced amplitude limited, phase rotated and filtered baseband signals 704, 714 and 724. The low pass filters 631, 632, and 633 filter the adjacent unwanted energy in the baseband signals 703, 713, and 723. The amplitude limited, phase rotated, and low pass filtered baseband signals 704, 714, and 724 are phase equalized by phase equalizers 641, 642, and 643 to produced the signals 705, 715, and 725. The phase equalized signals are then amplitude equalized by amplitude equalizers 651, 652, and 653 to produce amplitude equalized baseband signals 706, 716, and 726. The amplitude clipped, phase rotated, low pass filtered, phase equalized and amplitude equalized baseband signals 706, 716, and 726 are up converted to their original multi-carrier baseband frequency by up converter blocks 661, 662, and 663. The other signal used by up converter is supplied by NCOs 681, 682, and 683. The up converted signals 707, 717, and 727 are then combined in block 600 to produced the new multi-carrier baseband signal 412. In FIG. 5 only a multi-carrier with 3 carrier is shown. This approach can be applied to unlimited number of carriers.

What is claimed is:

1. A wireless peak suppression, phase and amplitude equalizer circuit for use with multi-carrier power amplifiers in a wireless communication system to enhance the linearity and performance of the amplifier, in wireless cellular, Personal Communication System (PCS), wireless Local Area Network (LAN), line of sight microwave, military, and satellite communication systems and any other none wireless applications, the peak suppression, phase and amplitude equalizer circuit comprising:

a multi-carrier receiver for the peak suppression, phase and amplitude equalization of Intermediate Frequency (IF) or Radio Frequency (RF) input signal to amplifier wherein the input signal is baseband then the multi-carrier receiver is bypassed;

a digital signal processing block to reduce peak-to-average of the multi-carrier input signal using amplitude clipping and phase rotation;

a digital signal processing block to use the amplitude clipped multi-carrier baseband signal to produce the phase rotation lookup table;

a digital signal processing block to converts the multi-carrier baseband input signal to individual carrier baseband signals wherein individual carrier baseband signal is phase rotated before being up converted to its original multi-carrier baseband signal;

a digital signal processing block to phase equalize the individual carrier baseband signal after being amplitude clipped, phase rotated and filtered;

a digital signal processing block to amplitude equalize the individual carrier baseband signal after being amplitude clipped, phase rotated and filtered;

a digital signal processing block to up converter the individual carriers baseband signal to their original baseband frequency after being amplitude clipped, phase rotated, filtered, phase equalized, and amplitude equalized;

a digital signal processing block that clips the amplitude of the multi-carrier baseband signal by preserving the phase;

a multi-carrier transmitter block that prepares the peak-to-average reduced multi-carrier signal for delivery to multi-carrier power amplifier.

2. The peak suppression, phase and amplitude equalizer circuit according to claim 1, wherein main multi-carrier input signal from the wireless transmitter is sampled using sub-harmonic sampling technique at the input frequency or at an intermediate frequency.

3. The peak suppression, phase and amplitude equalizer circuit according to claim 1, wherein the multi-carrier input signal from the wireless transmitter is sampled using sub-harmonic sampling technique at the input frequency or at an intermediate frequency and the digitized multi-carrier input signal is decimated to the appropriate number of samples per symbol for further digital signal processing.

4. The peak suppression, phase and amplitude equalizer circuit according to claim 1, wherein the multi-carrier input signal from the wireless transmitter is baseband and is sampled using Nyquist sampling technique and interpolated to produce the baseband multi-carrier signal with appropriate number of samples per symbol.

5. The peak suppression, phase and amplitude equalizer circuit according to claim 1, wherein the multi-carrier input signals from the wireless transmitter are in bit domain and the bit domain baseband signals are up converted, combined and interpolated to produce the digital multi-carrier baseband signal with appropriate number of sample per symbol.

6. The peak suppression, phase and amplitude equalizer according to claim 1, wherein the digital multi-carrier baseband signal is amplitude clipped without disturbing the phase before being down converted to produce individual carrier baseband representatives.

7. The peak suppression, phase and amplitude equalizer according to claim 1, wherein the amplitude clipped digital multi-carrier baseband signal is converted to single channel baseband signals by digital down conversion. The individual baseband signals are phase rotated using the phase from phase rotation lookup table, then filtered to eliminate the unwanted signals.

8. The peak suppression, phase and amplitude equalizer according to claim 1, wherein the individual carrier baseband signals after being phase rotated and filtered are phase equalized to maintain the phase property of the baseband signal before it was down converted.

9. The peak suppression, phase and amplitude equalizer according to claim 1, wherein the individual carrier baseband signals after being phase rotated, filtered, and phase equalized are amplitude equalized to maintain the modulation properties of the baseband signal before it was down converted.

10. The peak suppression, phase and amplitude equalizer according to claim 1, wherein the individual carrier baseband signals after being phase rotated, filtered, phase and amplitude equalized are up converted to their original baseband multi-carrier baseband frequency.

11. The peak suppression, phase and amplitude equalizer circuit according to claim 1, wherein the peak-to-average reduced signal is digitally up converted and converted to analog domain at an intermediate frequency or the output frequency.

12. The peak suppression, phase and amplitude equalizer circuit according to claim 1, wherein the peak-to-average reduced signal is converted to analog domain at baseband frequency and then up converted to IF or RF frequency in analog domain.

13. The peak suppression, phase and amplitude equalizer circuit according to claim 1, wherein the peak-to-average reduction phase rotation lookup table is created using the individual baseband representative of the amplitude clipped multi-carrier baseband signal and the amplitude clipped multi-carrier baseband signal.

14. The peak suppression, phase and amplitude equalizer circuit according to claim 1, wherein the received signal strength of the input signal to peak suppression, phase and amplitude equalizer circuit and transmit signal strength of the output from the peak suppression, phase and amplitude equalizer circuit is dynamically measures to adjust the total gain of the peak-to-average reduction circuit zero.

15. The peak suppression, phase and amplitude equalizer circuit according to claim 1, when it is used in wireless cellular, wireless PCS, wireless LAN, microwave, wireless satellite, none wireless amplifiers, and any wireless communication systems used for military applications.

16. The peak suppression, phase and amplitude equalizer circuit according to claim 1, wherein the Digital Signal Processing (DSP) function can be implemented in programmable logic, Field Programmable Gate Array (FPGA), Gate Array, Application Specific Integrated Circuit (ASIC), and DSP processor.

* * * * *